United States Patent
Yoshinaga (10) Patent No.: US 9,467,007 B2
(45) Date of Patent: Oct. 11, 2016

(54) POWER CONTROL SYSTEM AND POWER CONTROL METHOD THEREFOR, AND POWER GATEWAY APPARATUS AND POWER CONTROL METHOD THEREFOR

(75) Inventor: Koji Yoshinaga, Tokyo (JP)

(73) Assignee: NEC CORPORATION, Tokyo (JP)

(*) Notice: Subject to any disclaimer, the term of this patent is extended or adjusted under 35 U.S.C. 154(b) by 587 days.

(21) Appl. No.: 13/996,048

(22) PCT Filed: Dec. 19, 2011

(86) PCT No.: PCT/JP2011/079318
§ 371 (c)(1),
(2), (4) Date: Jun. 20, 2013

(87) PCT Pub. No.: WO2012/086572
PCT Pub. Date: Jun. 28, 2012

(65) Prior Publication Data
US 2013/0285448 A1    Oct. 31, 2013

(30) Foreign Application Priority Data

Dec. 24, 2010   (JP) ................. 2010-287156

(51) Int. Cl.
| | | |
|---|---|---|
| *H02J 9/00* | (2006.01) | |
| *H02J 1/10* | (2006.01) | |
| *H02J 9/06* | (2006.01) | |
| *H02J 3/00* | (2006.01) | |
| *H02J 3/14* | (2006.01) | |
| *H02J 3/32* | (2006.01) | |

(52) U.S. Cl.
CPC ............. *H02J 9/062* (2013.01); *H02J 3/005* (2013.01); *H02J 3/14* (2013.01); *H02J 3/32* (2013.01); *Y02B 70/3225* (2013.01); *Y04S 20/222* (2013.01); *Y10T 307/336* (2015.04)

(58) Field of Classification Search
USPC ................................. 307/23, 29
See application file for complete search history.

(56) References Cited

U.S. PATENT DOCUMENTS

| | | | | |
|---|---|---|---|---|
| 6,680,547 B1* | 1/2004 | Dailey | ............. | H02J 3/28 307/24 |
| 2004/0124709 A1* | 7/2004 | Eisenberger | ............. | H02J 9/061 307/29 |
| 2011/0204720 A1* | 8/2011 | Ruiz | ............. | B60L 11/1816 307/66 |

FOREIGN PATENT DOCUMENTS

| | | |
|---|---|---|
| CN | 1691464 A | 11/2005 |
| CN | 1922780 A | 2/2007 |
| CN | 101911425 A | 12/2010 |
| JP | 2000-92717 A | 3/2000 |
| JP | 2003-309926 A | 10/2003 |
| JP | 2009-244676 A | 10/2009 |

OTHER PUBLICATIONS

Chinese Office Action for CN Application No. 201180061726.0 issued on Nov. 3, 2014 with English Translation.
International Search Report for PCT Application No. PCT/JP2011/079318 mailed on Mar. 13, 2012.

* cited by examiner

*Primary Examiner* — Rexford Barnie
*Assistant Examiner* — Dru Parries (57) ABSTRACT

First power load apparatuses that use power from a power storage apparatus when a total power consumption amount of all of the plurality of power load apparatuses is greater than or equal to a threshold, and second power load apparatuses not included among the first power load apparatuses are included. A power gateway apparatus stops the supply of power from a power supply system to the first power load apparatuses and performs power supply from the power storage apparatus to the first power load apparatuses when a sum of a total power consumption amount of the second power load apparatuses and a total power consumption amount of the first power load apparatuses exceeds a threshold indicating a maximum value of the system power consumption amount. The power gateway apparatus supplies power from the power generation apparatus to the first power load apparatuses with priority to power from the power network.

13 Claims, 10 Drawing Sheets

POWER CONTROL SYSTEM AND POWER CONTROL METHOD THEREFOR, AND POWER GATEWAY APPARATUS AND POWER CONTROL METHOD THEREFOR

This application is a National Stage Entry of PCT/JP2011/079318 filed Dec. 19, 2011, which claims priority from Japanese Patent Application 2010-287156 filed Dec. 24, 2010, the contents of all of which are incorporated herein by reference, in their entirety.

TECHNICAL FIELD

The present invention relates to a power control system that supplies power to a plurality of power consumption apparatuses and a power control method therefor, and a power gateway apparatus and a power control method therefor.

BACKGROUND ART

A method of controlling power supplied to a plurality of power load apparatuses includes a method of directly controlling a power consumption amount of power load apparatuses through demand control or a method of directly connecting a storage battery to a power system and supplying power stored in the storage battery when a power consumption amount of power load apparatuses is excessive to thereby achieve power equalization of reducing a temporary power consumption amount.

Further, Patent Document 1 is disclosed as a technique for achieving such power equalization.

DOCUMENT OF THE PRIOR ART

Patent Document

Patent Document 1: Japanese Unexamined Patent Application, First Publication No. 2003-309926

DISCLOSURE OF INVENTION

Problems to be Solved by the Invention

Here, in a power control scheme of the power load apparatus in the demand control, it is necessary to perform power control by performing communication with each power load apparatus, and a measure such as including a communication functional unit in the power load apparatus is necessary. Further, there is a case in which an effect such as reduction of consumption power by the power control on the power load apparatus side does not necessarily reach an expected value, and in this case, it is necessary to stop power supply to the power load apparatus.

Further, in a scheme in which an upper side of the power load apparatus stops the supply of power of the power load apparatus through demand control, the power load apparatus may be adversely affected since the supply of the power stops regardless of a state of the power load apparatus.

Further, in a technique for supplying power to a power load apparatus using power stored in a fuel cell or a storage battery, when a scheme in which insufficient system power is reversely charged to a power supply system is taken, an introduction means is complicated since a reverse conversion apparatus and a protection functional unit according to grid code (code when power flows backward to the system) or the like are necessary.

Further, a power load apparatus to which power must be stably supplied from an electric power company via a power network and a power load apparatus to which power stored in a storage battery or the like need only be supplied may be present as power load apparatuses and may be both present in a power supply system. Accordingly, a more appropriate power control method is required.

Further, in an industrial company or the like, measures for environmental issues are urgently desired in order to perform business activities that are sustainable in the future. Particularly, although individual companies have taken actions to reduce and suppress power consumption, they have not taken hold due to the above problems with respect to the method.

Therefore, an object of the present invention is to provide a power control system and a power control method therefor and a power gateway apparatus and a power control method therefor capable of solving the above-described problems.

Solution to Problem

In order to achieve the aforementioned objects, the present invention is a power control system including, among a plurality of power load apparatuses, first power load apparatuses that use power supplied from a power storage apparatus when a total power consumption amount of all of the plurality of power load apparatuses is greater than or equal to a threshold, and second power load apparatuses not included among the first power load apparatuses, wherein the power control system includes a power gateway apparatus including: a second power load apparatus consumption amount reception unit that receives a total power consumption amount of the second power load apparatuses from a power consumption amount detection device that detects power consumption amounts of the second power load apparatuses; a first power load apparatus consumption amount detection unit that detects power consumption amounts of the first power load apparatuses to detect a total power consumption amount of the first power load apparatuses; a total power consumption amount determination unit that determines whether a sum of the total power consumption amount of the second power load apparatuses and the total power consumption amount of the first power load apparatuses exceeds a threshold of the system power consumption amount; and a power supply control unit that stops supply of power received from a power supply system to the first power load apparatuses and performs power supply from the power storage apparatus to the first power load apparatuses when the sum of the total power consumption amount of the second power load apparatuses and the total power consumption amount of the first power load apparatuses exceeds a threshold indicating a maximum value of the system power consumption amount.

Further, the present invention is a power control method in a power control system including: among a plurality of power load apparatuses, first power load apparatuses that use power supplied from a power storage apparatus when a total power consumption amount of all of the plurality of power load apparatuses is greater than or equal to a threshold, and second power load apparatuses not included among the first power load apparatuses; and a power gateway apparatus that performs control of power supply to the first power load apparatuses, wherein: the power gateway apparatus receives a total power consumption amount of the second power load apparatuses from a power consumption amount detection device that detects the power consumption amounts of the second power load apparatuses, detects the power consumption amount of the first power load apparatuses to detect a total power consumption amount of the first power load apparatuses, determines whether a sum of the total power consumption amount of the second power load apparatuses and the total power consumption amount of the first power load apparatuses exceeds a threshold of a system power consumption amount, and stops supply of power received from a power supply system to the first power load apparatuses and performs power supply from the power storage apparatus to the first power load apparatuses when the sum of the total power consumption amount of the second power load apparatuses and the total power consumption amount of the first power load apparatuses exceeds a threshold indicating a maximum value of the system power consumption amount.

Further, the present invention is, in a power control system comprising, among a plurality of power load apparatuses, first power load apparatuses that use power supplied from a power storage apparatus when a total power consumption amount of all of the plurality of power load apparatuses is greater than or equal to a threshold, and second power load apparatuses not included among the first power load apparatuses, a power gateway apparatus that performs control of power supply to the first power load apparatuses, the power gateway apparatus including: a second power load apparatus consumption amount reception unit that receives a total power consumption amount of the second power load apparatuses from a power consumption amount detection device that detects the power consumption amounts of the second power load apparatuses; a first power load apparatus consumption amount detection unit that detects the power consumption amount of the first power load apparatuses to detect a total power consumption amount of the first power load apparatuses; a total power consumption amount determination unit that determines whether a sum of the total power consumption amount of the second power load apparatuses and the total power consumption amount of the first power load apparatuses exceeds a threshold of a system power consumption amount; and a power supply control unit that stops supply of power received from a power supply system to the first power load apparatuses and performs power supply from the power storage apparatus to the first power load apparatuses when the sum of the total power consumption amount of the second power load apparatuses and the total power consumption amount of the first power load apparatuses exceeds a threshold indicating a maximum value of the system power consumption amount.

Further, the present invention is, in a power control system comprising, among a plurality of power load apparatuses, first power load apparatuses that use power supplied from a power storage apparatus when a total power consumption amount of all of the plurality of power load apparatuses is greater than or equal to a threshold, and second power load apparatuses not included among the first power load apparatuses, a power control method of a power gateway apparatus that performs control of power supply to the first power load apparatuses, the method including receiving a total power consumption amount of the second power load apparatuses from a power consumption amount detection device that detects power consumption amounts of the second power load apparatuses, detecting power consumption amounts of the first power load apparatuses to detect a total power consumption amount of the first power load apparatuses, determining whether a sum of the total power consumption amount of the second power load apparatuses and the total power consumption amount of the first power load apparatuses exceeds a threshold of a system power consumption amount, and stopping supply of power received from a power supply system to the first power load apparatuses and performing power supply from the power storage apparatus to the first power load apparatuses when the sum of the total power consumption amount of the second power load apparatuses and the total power consumption amount of the first power load apparatuses exceeds a threshold indicating a maximum value of the system power consumption amount.

Effects of the Invention

According to the present invention, even when the power consumption of an entire system temporarily increases, power supply from the storage battery to some power load apparatuses is performed and power supply from the power supply system such as the power network of the electric power company to other power load apparatuses to which the power supply is desired to be stably performed is performed. Accordingly, it is possible to equalize the supply of the power and perform stable power supply to predetermined power load apparatuses. Further, since the power generated by the power generation apparatus does not flow backward, a reverse conversion apparatus and a protection functional unit according to the grid code or the like are unnecessary, and introduction is easy.

EMBODIMENTS FOR CARRYING OUT THE INVENTION

First Embodiment

Hereinafter, a description will be given with reference to the drawings of a power control system according to a first embodiment of the present invention.

Figure 1:
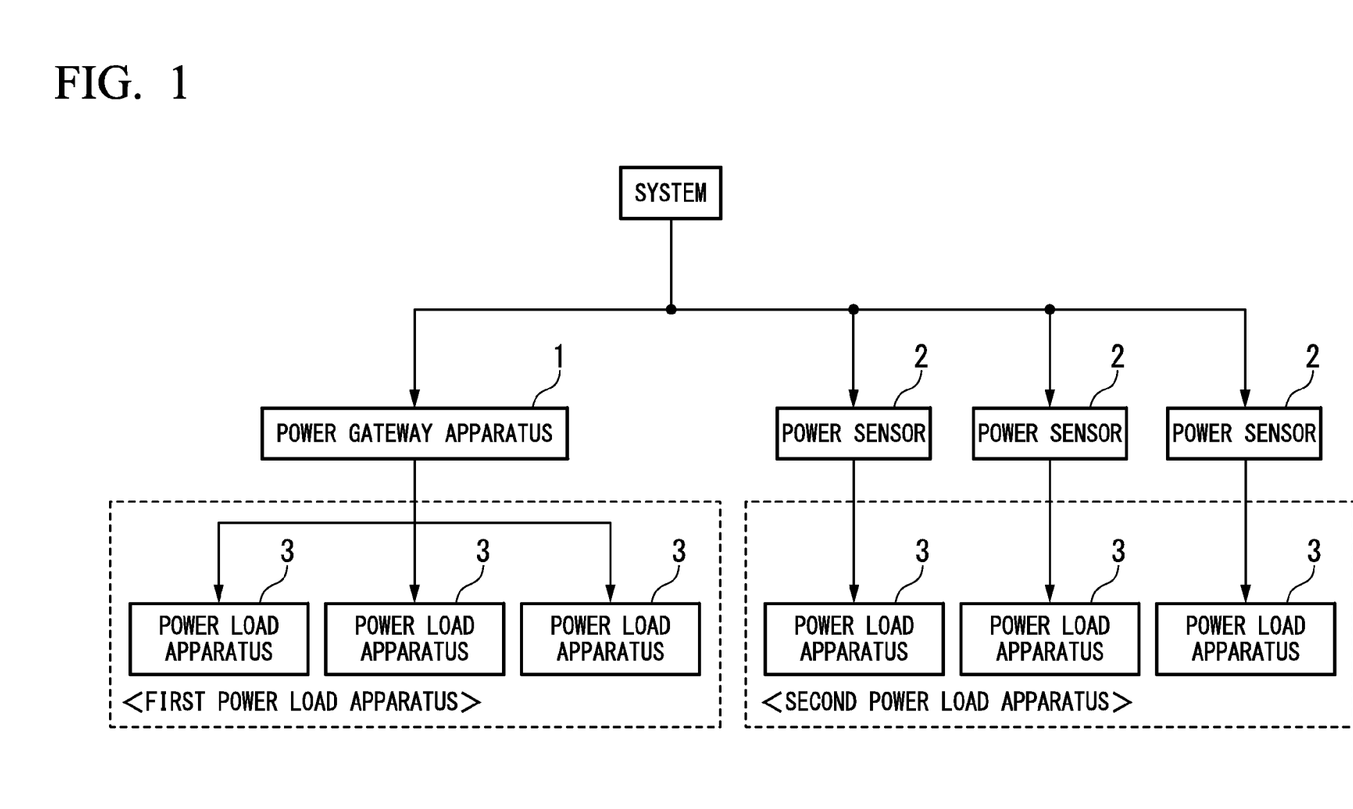
FIG. 1 is a block diagram illustrating a configuration of a power control system according to a first embodiment of the present invention.

FIG. 1 is a block diagram illustrating a configuration of the power control system according to the first embodiment.

In FIG. 1, reference sign 1 indicates a power gateway 1, reference sign 2 indicates a power sensor (power consumption amount detection device), and reference sign 3 indicates a power load apparatus.

As illustrated in FIG. 1, a plurality of power load apparatuses 3 in the first embodiment are classified into first power load apparatuses 3 that use power supplied from a power storage apparatus included in the power gateway apparatus 1 when a total power consumption amount of all of the plurality of power load apparatuses 3 is greater than or equal to a threshold, and second power load apparatuses 3 not included among the first power load apparatuses.

Further, the first power load apparatuses 3 are connected as subordinate apparatuses to the power gateway apparatus 1 via a power line or the like. Further, the second power load apparatuses 3 are connected to the power sensors 2 via a power line or like in one-to-one correspondence. The power gateway apparatus 1 and the power sensors 2 are connected to a power supply system.

Figure 2:
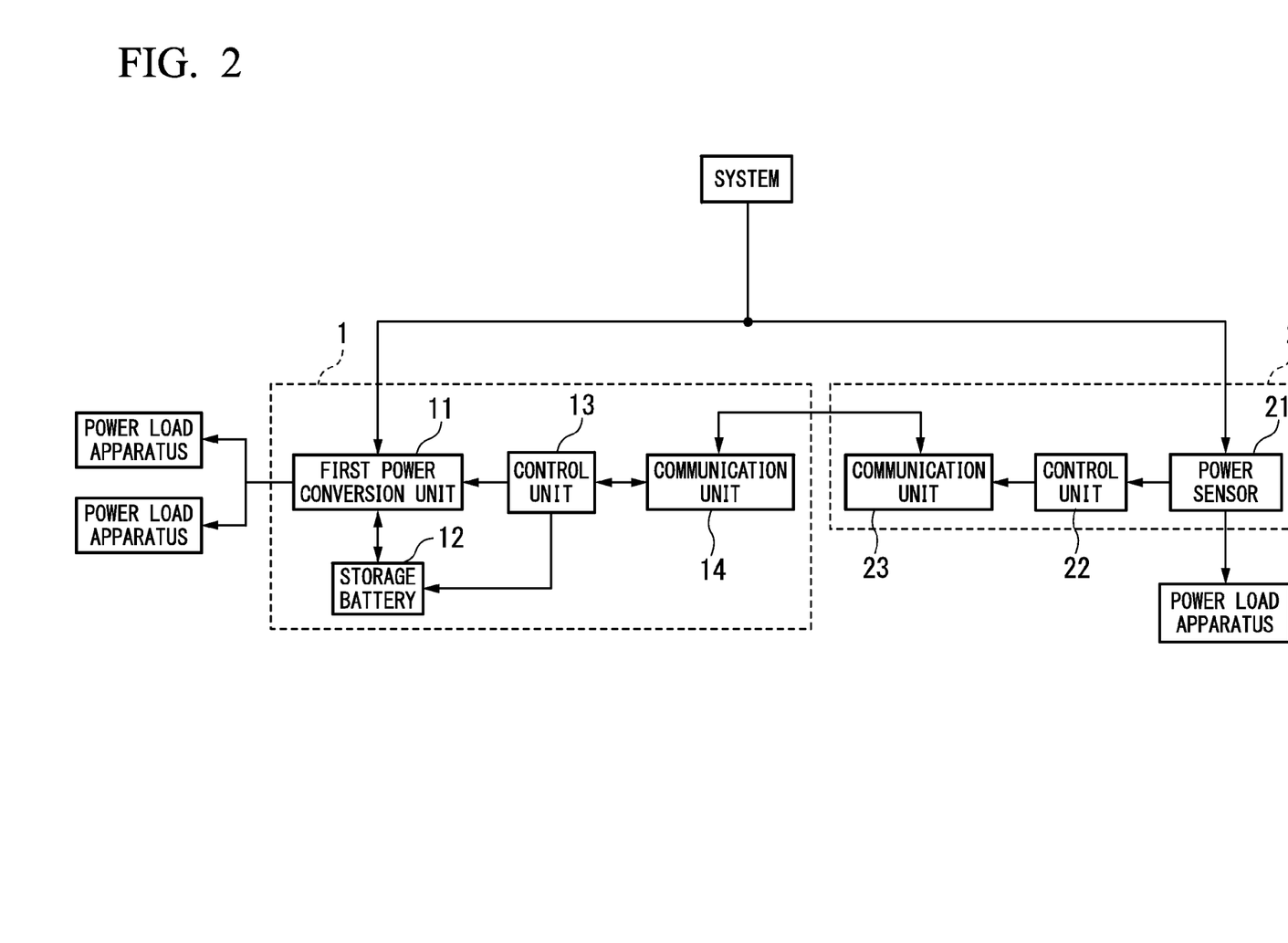
FIG. 2 is a diagram illustrating a connection relationship of a power gateway apparatus and a power sensor, and functional units thereof according to the first embodiment of the present invention.

FIG. 2 is a diagram illustrating a connection relationship of the power gateway apparatus and the power sensor and functional units thereof.

As illustrated in FIG. 2, the power gateway apparatus 1 includes functional units of a first power conversion unit 11, a storage battery 12, a control unit 13, and a communication unit 14. Here, the first power conversion unit 11 is a functional unit that supplies power resulting from an alternating current obtained from the power supply system to the power load apparatuses 3, and converts power resulting from a direct current obtained from the storage battery 12 to an alternating current when supplying power stored in the storage battery 12 to the power load apparatuses 3 and supplies the alternating current. Further, the control unit 13 is a processing unit that performs each process for power control. Further, the communication unit 14 is a processing unit that performs communication with the power sensor 2.

Further, the power sensor 2 includes respective functional units of a sensor unit 21, a control unit 22, and a communication unit 23. Here, the sensor unit 21 is a functional unit that detects an amount of power supplied to the power load apparatus 3. For example, the sensor unit 21 detects consumption power of the power load apparatus 3 at a certain time by integrating a value obtained by multiplying current by voltage. Further, the control unit 22 is a processing unit that controls the sensor unit 21 or the communication unit 23, and the communication unit 23 is a processing unit that performs communication with the power gateway apparatus 1.

Figure 3:
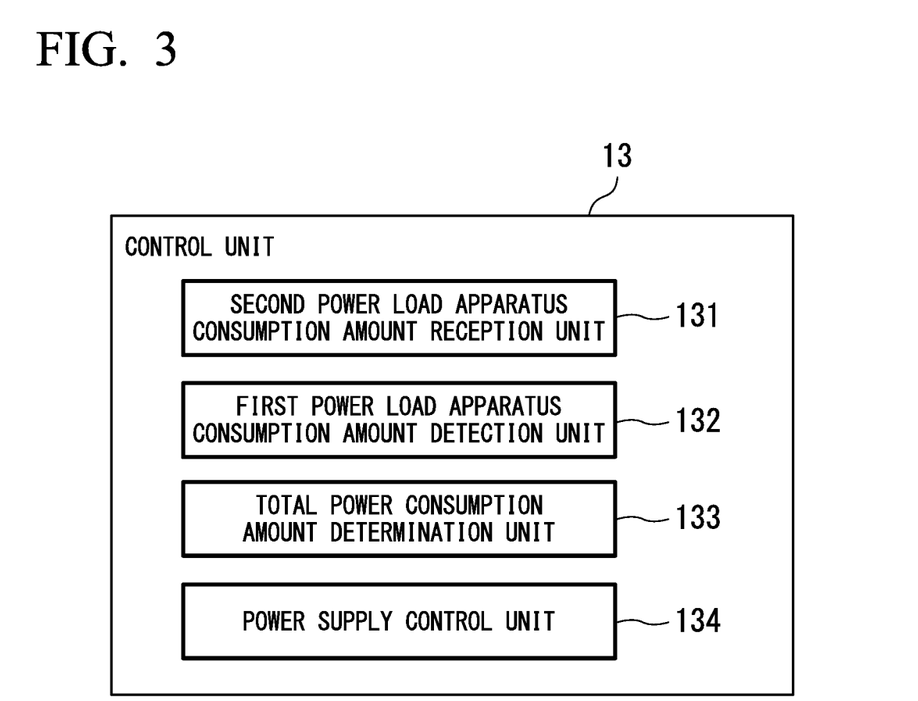
FIG. 3 is a diagram illustrating functional unit blocks in a control unit of the power gateway apparatus according to the first embodiment of the present invention.

FIG. 3 is a diagram illustrating functional unit blocks in the control unit of the power gateway apparatus.

The control unit 13 of the power gateway apparatus 1 includes respective processing units of a second power load apparatus consumption amount reception unit 131, a first power load apparatus consumption amount detection unit 132, a total power consumption amount determination unit 133, and a power supply control unit 134, as illustrated in FIG. 3.

Here, the second power load apparatus consumption amount reception unit 131 is a processing unit that receives a total power consumption amount of the second power load apparatuses 3, which are connected via the power line, from the power sensors 2 that detect the power consumption amount of the second power load apparatuses 3.

Further, the first power load apparatus consumption amount detection unit 132 is a processing unit that detects a total power consumption amount of all of the first power load apparatuses 3.

Further, the total power consumption amount determination unit 133 is a processing unit that determines whether a sum of the total power consumption amount of the second power load apparatuses 3 and the total power consumption amount of the first power load apparatuses 3 exceeds a threshold of a system power consumption amount.

Further, the power supply control unit 134 is a processing unit that stops the supply of the power received from the power supply system to the first power load apparatuses 3 and performs power supply from the storage battery 12 to the first power load apparatuses 3 when the sum of the total power consumption amount of the second power load apparatuses 3 and the total power consumption amount of the first power load apparatuses 3 exceeds a threshold indicating a maximum value of the system power consumption amount.

Figure 4:
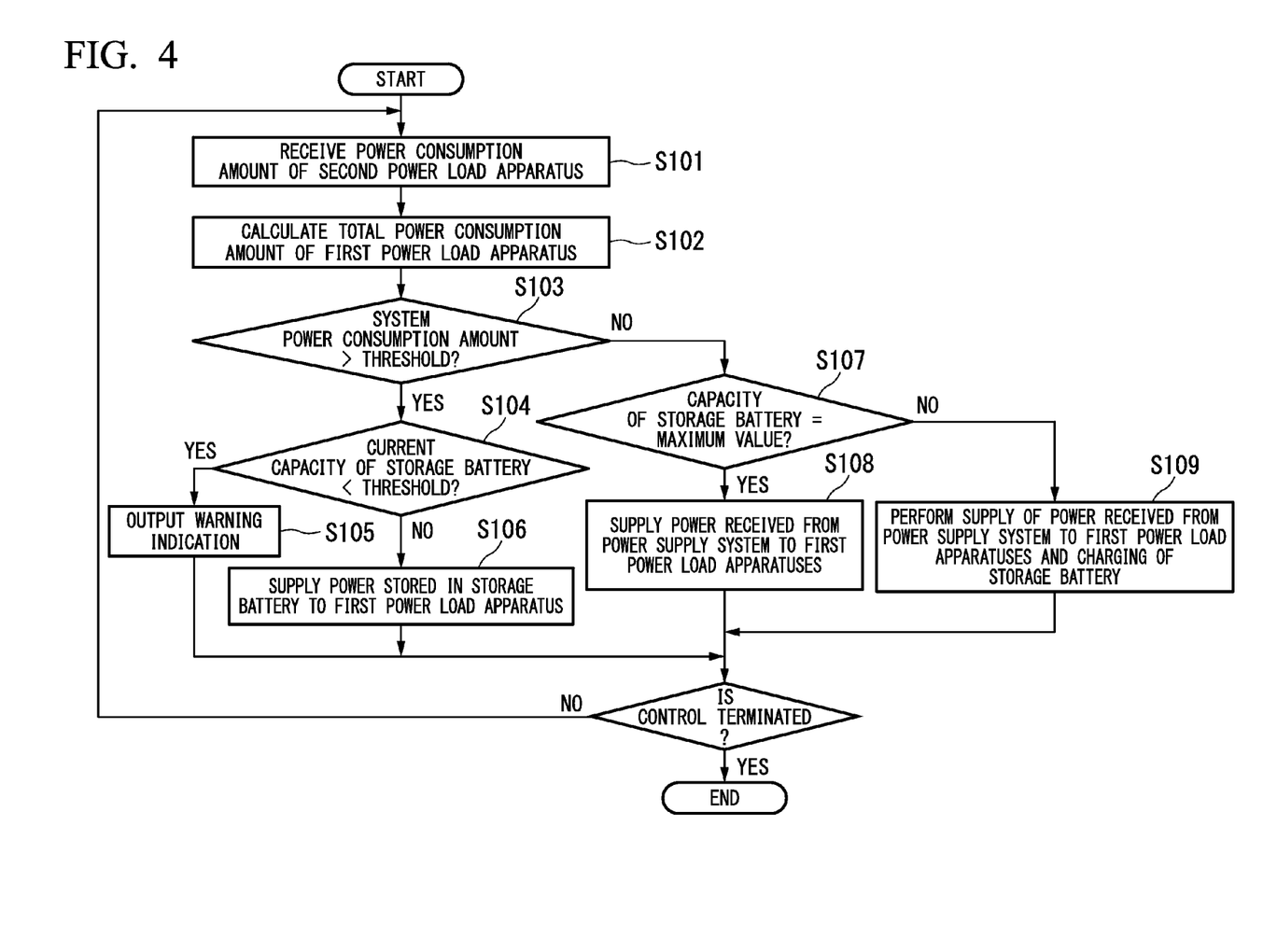
FIG. 4 is a diagram illustrating a process flow of the power gateway apparatus according to the first embodiment of the present invention.

FIG. 4 is a diagram illustrating a process flow of the power gateway apparatus according to the first embodiment.

Next, details of the process of the power sensor 2 and the power gateway apparatus 1 will be described in order.

First, in each of the plurality of power sensors 2, the sensor unit 21 calculates a power consumption amount of the second power load apparatus 3 based on control of the control unit 22, and the communication unit 23 notifies the power gateway apparatus 1 of the power consumption amount. Accordingly, the second power load apparatus consumption amount reception unit 131 of the power gateway apparatus 1 receives the power consumption amounts for all the power load apparatuses 3 included among the second power load apparatuses 3 (step S101).

Further, in the control unit 13 of the power gateway apparatus 1, the first power load apparatus consumption amount detection unit 132 calculates the total power consumption amount of the first power load apparatuses 3 (step S102). The calculation of the total power consumption amount of the first power load apparatuses 3 is performed by integrating a value obtained by multiplying a current and a voltage transmitted to all the power load apparatuses 3 included among the first power load apparatuses 3, similar to the power sensor 2. Further, the total power consumption amount determination unit 133 of the power gateway apparatus 1 adds the power consumption amount of all the power load apparatuses 3 included among the second power load apparatuses 3 received from the power sensors 2 to the total power consumption amount of the first power load apparatuses 3 calculated by the first power load apparatus consumption amount detection unit 132 to calculate the system power consumption amount used in all the power load apparatuses 3 belonging to the power control system.

Further, in the control unit 13 of the power gateway apparatus 1, the power supply control unit 134 determines whether the system power consumption amount of all the power load apparatuses 3 belonging to the power control system exceeds a predetermined threshold (step S103). The predetermined threshold is, for example, a maximum value of an amount of power that can be supplied to the first power load apparatus 3 when the power load apparatuses 3 included among the second power load apparatuses 3 can stably obtain the power. Further, when the system power consumption amount is greater than the threshold, the power supply control unit 134 identifies a current capacity or charging rate of the storage battery 12 and determines whether the current capacity or charging rate of the storage battery 12 is less than a predetermined threshold (step S104).

Here, when the current capacity or charging rate of the storage battery 12 is less than the predetermined threshold, the power supply control unit 134 determines that the power cannot be supplied from the storage battery 12 to the power load apparatuses 3 included among the first power load apparatuses 3. Accordingly, when the current capacity or charging rate of the storage battery 12 is less than the predetermined threshold, the power supply control unit 134 outputs a warning indication to a monitor or the like that may be included in the power gateway apparatus 1 (step S105).

On the other hand, when the current capacity or charging rate of the storage battery 12 is greater than or equal to the predetermined threshold, the power supply control unit 134 determines that the power can be supplied from the storage battery 12 to the first power load apparatuses 3. Accordingly, the power supply control unit 134 stops the supply of the power received from the power supply system to the first power load apparatuses 3 and supplies the power stored in the storage battery 12 to the first power load apparatuses 3 (step S106).

Further, when the system power consumption amount in all the power load apparatuses 3 belonging to the power control system is less than or equal to the threshold in step S103 described above, a determination is then made as to whether the current capacity or charging rate of the storage battery 12 is a maximum value (MAX) (step S107). Further, when the current capacity or the charging rate of the storage battery 12 is the maximum value (MAX), the power supply control unit 134 performs the supply of the power received from the power supply system to the first power load apparatus (step S108). Further, when the current capacity or the charging rate of the storage battery 12 is not the maximum value (MAX), i.e., when the current capacity or the charging rate of the storage battery 12 is less than the maximum value in step S107, the power supply control unit 134 performs the supply of the power received from the power supply system to the first power load apparatus and charging of the storage battery 12 (step S109).

Further, in the power gateway apparatus 1, the process of steps S101 to S109 described above is repeated.

According to the above-described process, even when the power consumption amount of the entire system temporarily increases, the power supply from the storage battery to some power load apparatuses, i.e., the first power load apparatuses 3, is performed, and the power supply from the power supply system such as the power network of the electric power company to the other power load apparatuses, i.e., the second power load apparatuses 3 to which the power supply is desired to be stably performed, is performed. Accordingly, the supply of the power can be equalized and stable power supply to some of the power load apparatuses 3 can be performed. Further, a reverse conversion apparatus and a protection functional unit according to the grid code are unnecessary and an introduction is easy.

Second Embodiment

Figure 5:
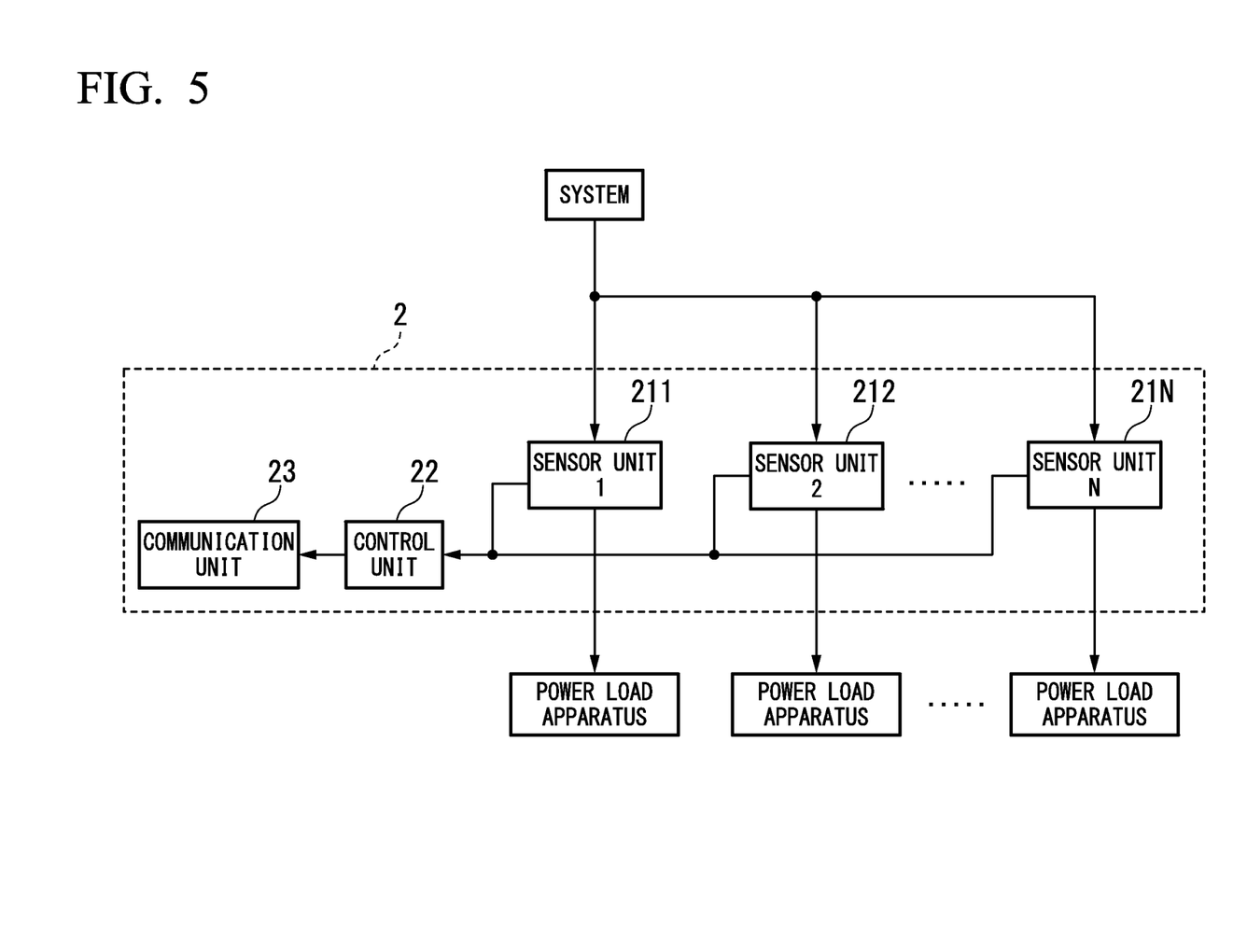
FIG. 5 is a diagram illustrating a configuration of a power sensor according to a second embodiment.

FIG. 5 is a diagram illustrating a configuration of a power sensor according to a second embodiment.

The example when one power sensor 2 is connected at an upper level of a power system of each of the second power load apparatuses 3 via the power line in the configuration of the power control system illustrated in FIG. 1 has been described. However, in this case, it is necessary for each power sensor 2 to include the communication unit 23 and the control unit 22. Accordingly, as illustrated in FIG. 5, one power sensor 2 is included at an upper level of a power system of each of the second power load apparatuses 3, and the power sensor 2 may include sensor units 211, 212, . . . , 21N that calculate consumption powers of the second power load apparatuses 3. By unifying the plurality of power sensors 2 in this way, it is possible to decrease the number of communications between the power gateway and the power sensor 2 and reduce the process of the power gateway apparatus 1.

Third Embodiment

Figure 6:
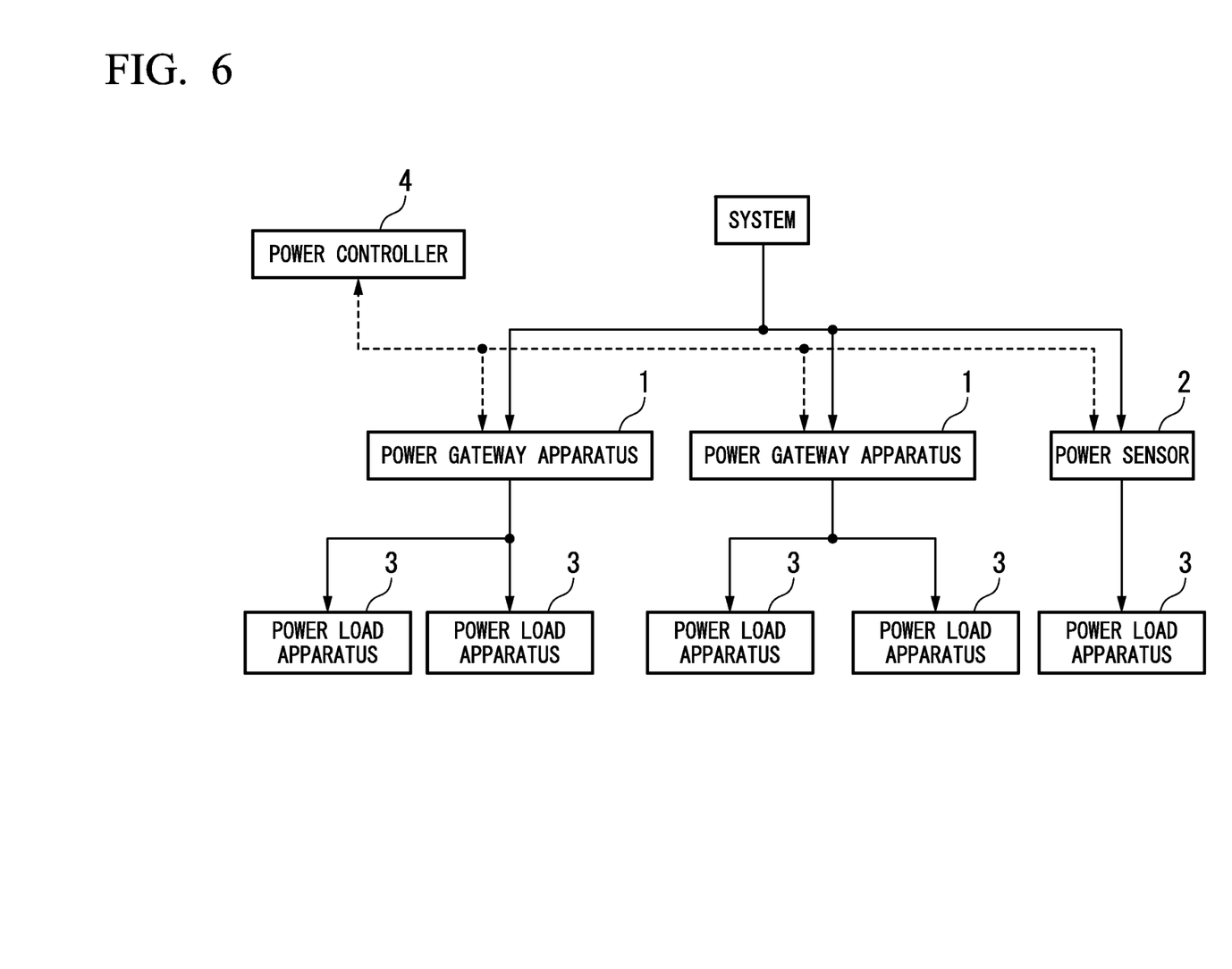
FIG. 6 is a block diagram illustrating a configuration of a power control system according to a third embodiment.

FIG. 6 is a block diagram illustrating a configuration of a power control system according to a third embodiment.

While one power gateway apparatus 1 is included in the configuration of the power control system illustrated in FIG. 1, a plurality of power gateway apparatuses 1 may be included. In this case, a power controller 4 is further included in the power control system. The power controller 4 is independent and includes a power control unit in the control unit 13 illustrated in the first embodiment, thereby collectively controlling the control between the power gateway apparatuses becomes possible.

Fourth Embodiment

Figure 7:
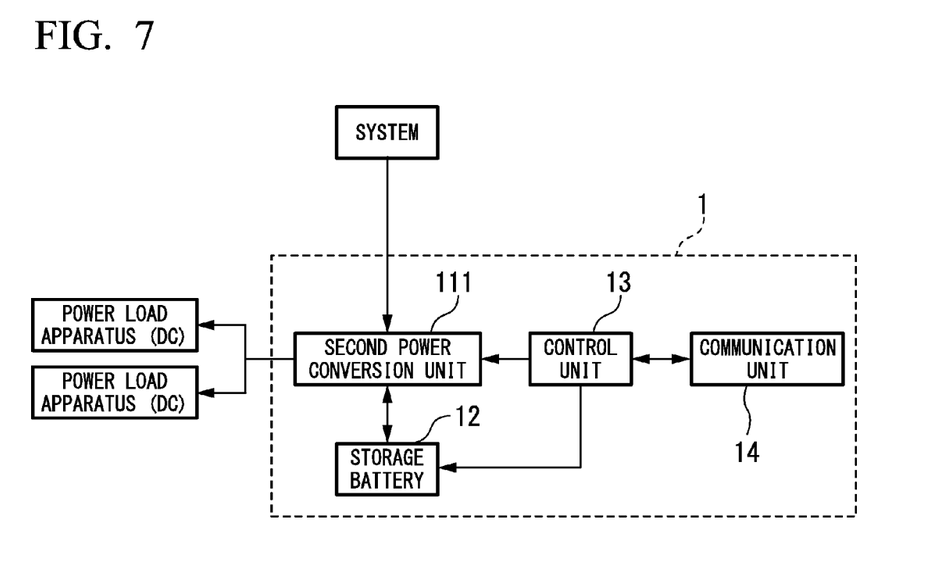
FIG. 7 is a block diagram illustrating a configuration of a power gateway apparatus according to a fourth embodiment.

FIG. 7 is a block diagram illustrating a configuration of a power gateway apparatus according to a fourth embodiment.

While the power gateway apparatus 1 is assumed to supply the power resulting from an AC to the power load apparatuses 3 in the configuration of the power control system illustrated in FIG. 1, a second power conversion unit 111 is included in place of the first power conversion unit 11, and converts AC power supplied from a system of a power network of an electric power company to DC power and supplies the DC power to the power load apparatuses 3, which use the DC power. Further, the second power conversion unit 111 can suppress loss of the power conversion at the time of the power supply from the storage battery 12 since DC/AC conversion is unnecessary when the power is supplied from the storage battery 12 and the power resulting from the DC from the storage battery 12 is directly supplied to the power load apparatus 3.

Fifth Embodiment

Figure 8:
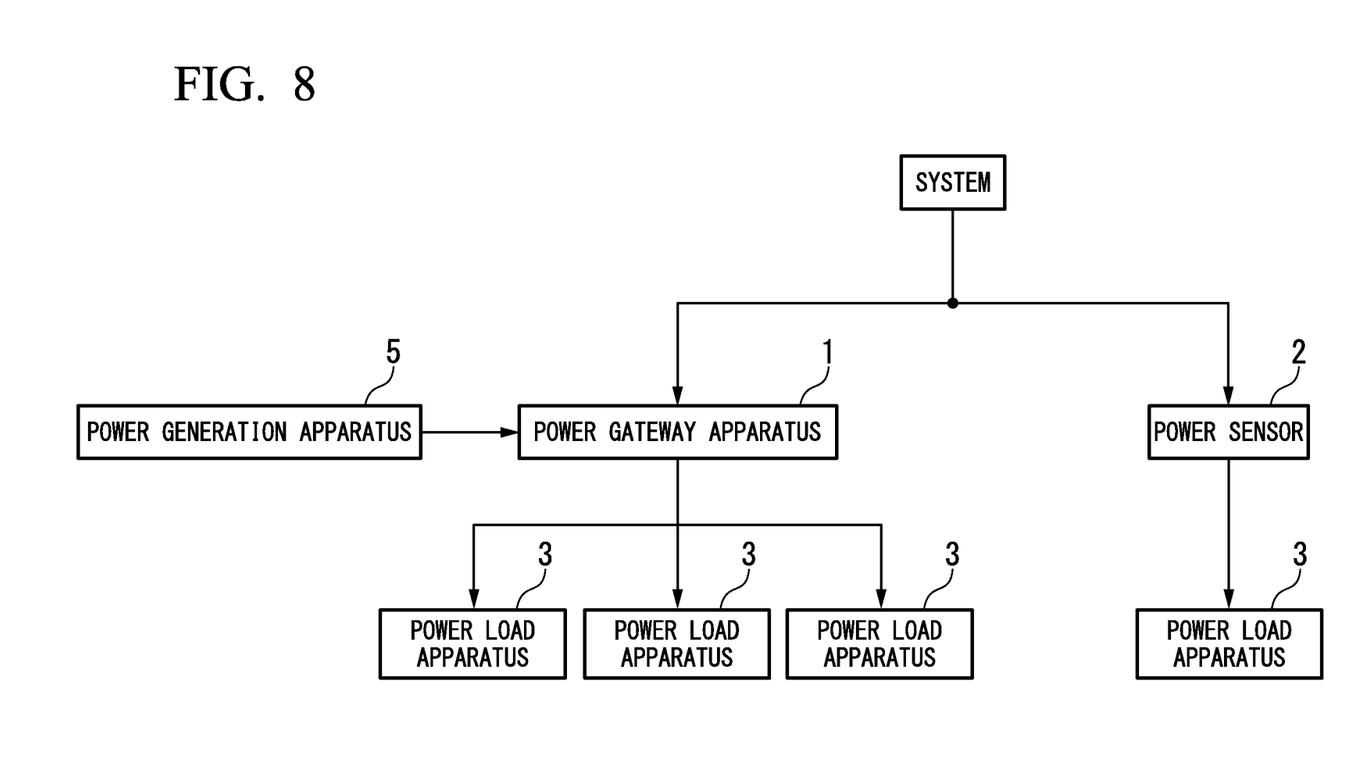
FIG. 8 is a block diagram illustrating a configuration of a power control system according to a fifth embodiment.

FIG. 8 is a block diagram illustrating a configuration of a power control system according to a fifth embodiment.

The power control system according to the fifth embodiment includes a power generation apparatus 5, as illustrated in FIG. 8. Further, a power gateway apparatus 1 is connected to each of power supply systems of power supplied from a power network of an electric power company and power supplied from the power generation apparatus 5. Here, in the control unit 13 of the power gateway apparatus 1, the power supply control unit 134 supplies the power supplied from the power generation apparatus 5 to the first power load apparatuses 3 with priority to the power received from the power network. Since the power from the power generation apparatus 5 is directly supplied to the power gateway apparatus 1, backward flow of the power to the system does not occur. Accordingly, it is possible to provide a power control system considering the grid code or the like.

Further, methods of controlling power in the power supply control unit 134 include (1) a method in which the power gateway apparatus 1 performs the power supply to the first power load apparatus 3 only through the power supply from the power system of the power network of the electric power company, as described in the first embodiment, (2) a method of stopping the power supply from the power system of the power network of the electric power company and performing the power supply from the storage battery 12 to the power load apparatus 3, (3) a method of performing power supply from both of the power system of the power network of the electric power company and the storage battery 12 to the first power load apparatus 3, (4) a method of performing power supply from the power generation apparatus 5 to the power load apparatus 3, and (5) a method of performing power supply from the power generation apparatus 5 to the first power load apparatus 3, and performing any one or both of the power supply from the power system of the power network of the electric power company and the power supply from the storage battery 12 only when the power is insufficient.

Sixth Embodiment

Figure 9:
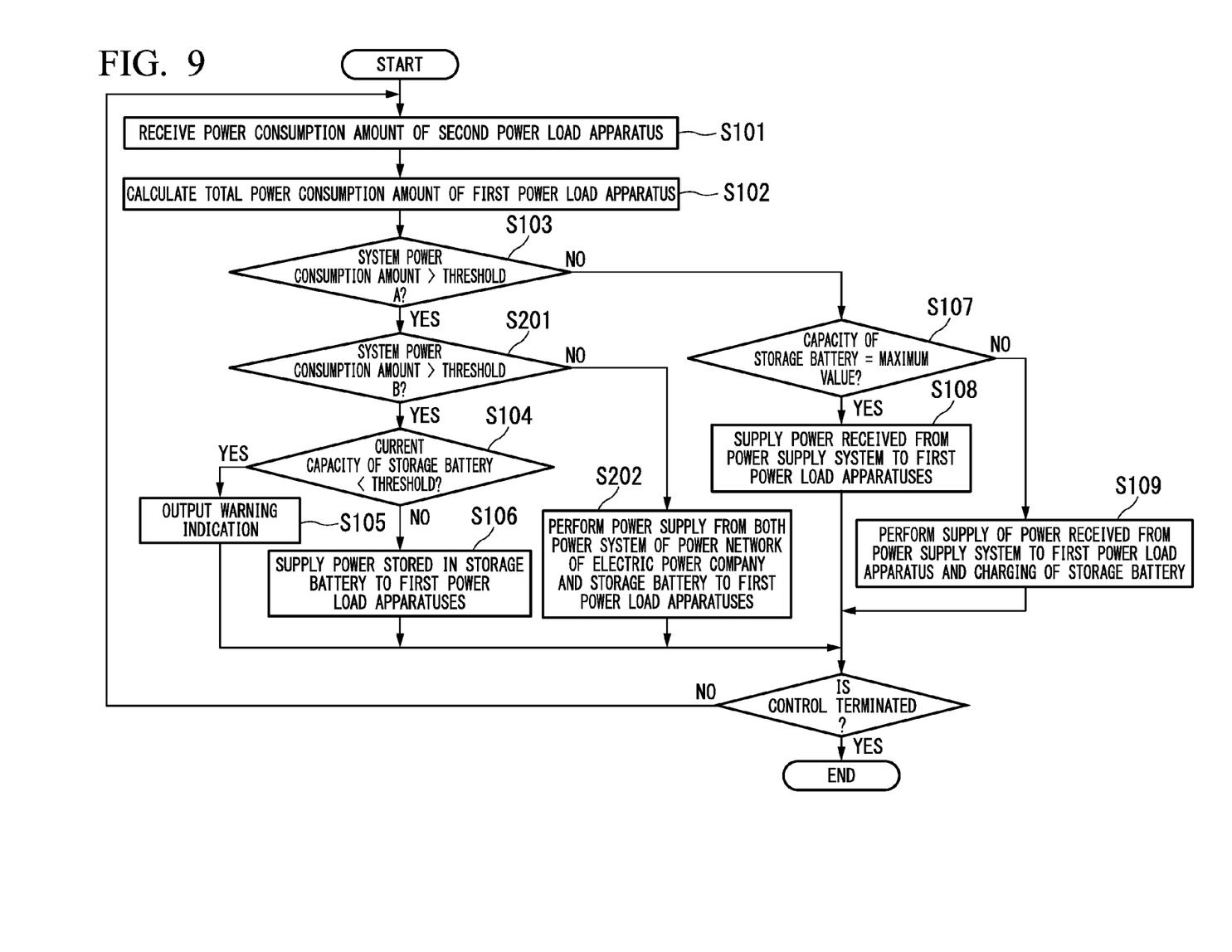
FIG. 9 is a diagram illustrating a process flow of a power gateway apparatus according to a sixth embodiment.

FIG. 9 is a diagram illustrating a process flow of a power gateway apparatus according to a sixth embodiment.

Figure 10:
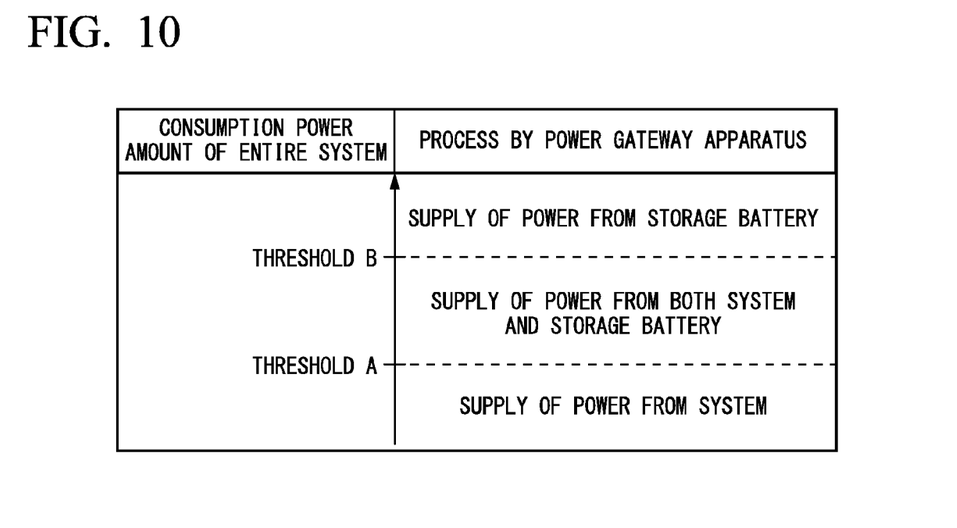
FIG. 10 is a diagram illustrating an overview of power control by the power gateway apparatus according to the sixth embodiment.

FIG. 10 is a diagram illustrating an overview of power control in the power gateway apparatus.

A process flow of the power gateway apparatus 1 illustrated in FIG. 9 is different from the process flow of the power gateway apparatus 1 illustrated in FIG. 4 in that two different thresholds are used and a determination is made as to whether a system power consumption amount exceeds each threshold. In other words, in step S103 in the first embodiment, the power supply control unit 134 in the control unit 13 of the power gateway apparatus 1 determines whether the system power consumption amount used in all the power load apparatuses 3 belonging to the power control system exceeds threshold A (step S103). Further, when the system power consumption amount is greater than threshold A, the power supply control unit 134 then determines whether the system power consumption amount used in all the power load apparatuses 3 belonging to the power control system exceeds threshold B (threshold B>threshold A) (step S201). Further, when the system power consumption amount is not greater than threshold B, the process of step S104 is performed, as in the first embodiment. In other words, the power supplied from the power system of the power network of the electric power company stops and the power supply from the storage battery 12 to the first power load apparatuses 3 is performed.

Further, in step S201, when the system power consumption amount is less than threshold B, the power supply from both the power system of the power network of the electric power company and the storage battery 12 to the first power load apparatuses is performed (step S202). Other processes are similar to those in the first embodiment.

Figure 11:
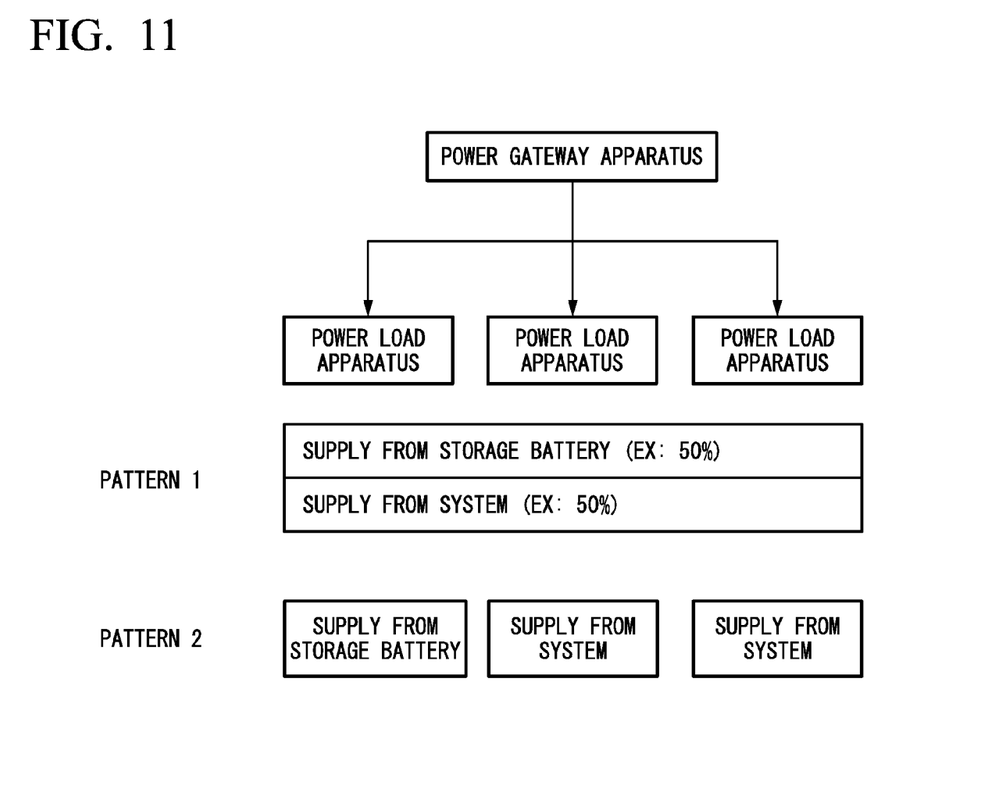
FIG. 11 is a diagram illustrating a process overview of the power gateway apparatus according to the sixth embodiment.

FIG. 11 is a diagram illustrating a process overview of the power gateway apparatus.

When the power supply control unit 134 in the control unit 13 of the power gateway apparatus 1 performs the power supply to the first subordinate power load apparatuses 3, for example, when it is determined that system power consumption amount is not greater than the threshold B in step S201 of the process of the sixth embodiment described above, the power supply control unit 134 may perform control so that the power supply from the power system of the power network is 50% and the power supply from the storage battery 12 is 50% as illustrated in pattern 1 of FIG. 11. Further, a proportion of the power supply from each power supply source may be changed according to a predetermined setting condition.

Further, as illustrated in pattern 2 of FIG. 11, the power gateway apparatus 1 may include a sensor that detects a power consumption amount of each of the first subordinate power load apparatuses 3, determine a power supply source (the power supply from the power network or the power supply from the storage battery 12) for each of the first subordinate power load apparatuses 3, and perform the power supply to each power load apparatus 3.

Further, a computing system may be included in the above-described power gateway apparatus. Further, the above process may be performed by being stored in a computer-readable recording medium in a program format and the computer reading and executing this program. Here, the computer-readable recording medium refers to a magnetic disk, a magnetic optical disc, a CD-ROM, a DVD-ROM, a semiconductor memory or the like. Further, this computer program may be distributed to a computer by a communication line, and the computer receiving this distribution may execute the program.

Priority is claimed on Japanese Patent Application No. 2010-287156, filed Dec. 24, 2010, the content of which is incorporated herein by reference.

INDUSTRIAL APPLICABILITY

It is possible to equalize the supply of the power and perform stable power supply to some power load apparatuses and to provide a power control system according to the grid code or the like.

DESCRIPTION OF REFERENCE SYMBOLS

- 1 power gateway apparatus
- 2 power sensor
- 3 power load apparatus
- 4 power controller
- 5 power generation apparatus
- 11 first power conversion unit
- 12 storage battery
- 13 control unit
- 14 communication unit
- 21 sensor unit
- 22 control unit
- 23 communication unit
- 131 second power load apparatus consumption amount reception unit
- 132 first power load apparatus consumption amount detection unit
- 133 total power consumption amount determination unit
- 134 power supply control unit

What is claimed is:

1. A power control system including, among a plurality of power load apparatuses, first power load apparatuses that use power supplied from a power storage apparatus when a total power consumption amount of all of the plurality of power load apparatuses is greater than or equal to a threshold, and second power load apparatuses not included among the first power load apparatuses, wherein the power control system includes a power gateway apparatus comprising:

a second power load apparatus consumption amount reception unit that receives a total power consumption amount of the second power load apparatuses from a power consumption amount detection device that detects power consumption amounts of the second power load apparatuses;

a first power load apparatus consumption amount detection unit that detects power consumption amounts of the first power load apparatuses to detect a total power consumption amount of the first power load apparatuses;

a total power consumption amount determination unit that determines whether a sum of the total power consumption amount of the second power load apparatuses and the total power consumption amount of the first power load apparatuses exceeds a threshold of the system power consumption amount; and a power supply control unit that stops supply of power received from a power supply system to the first power load apparatuses and performs power supply from the power storage apparatus to the first power load apparatuses when the sum of the total power consumption amount of the second power load apparatuses and the total power consumption amount of the first power load apparatuses exceeds a threshold indicating a maximum value of the system power consumption amount.

2. The power control system according to claim 1, wherein the power supply control unit of the power gateway apparatus supplies the power received from the power supply system to the first power load apparatuses and performs charging of the power storage apparatus when the sum of the total power consumption amount of the second power load apparatuses and the total power consumption amount of the first power load apparatuses is less than the threshold indicating the maximum value of the system power consumption amount and when a power storage capacity of the power storage apparatus is less than a maximum value.

3. The power control system according to claim 1, wherein the power supply control unit of the power gateway apparatus supplies the power received from the power supply system to the first power load apparatuses when the sum of the total power consumption amount of the second power load apparatuses and the total power consumption amount of the first power load apparatuses is less than the threshold indicating the maximum value of the system power consumption amount and when the power storage capacity of the power storage apparatus is the maximum value.

4. The power control system according to claim 1, comprising a power generation apparatus, wherein:
  the power supply system is each system of power supplied from a power network of an electric power company and power supplied from the power generation apparatus, and
  the power supply control unit of the power gateway apparatus supplies the power supplied from the power generation apparatus to the first power load apparatuses with priority to the power received from the power network.

5. A power control method in a power control system comprising:
  among a plurality of power load apparatuses, first power load apparatuses that use power supplied from a power storage apparatus when a total power consumption amount of all of the plurality of power load apparatuses is greater than or equal to a threshold, and second power load apparatuses not included among the first power load apparatuses; and a power gateway apparatus that performs control of power supply to the first power load apparatuses, wherein:
  the power gateway apparatus
  includes a power supply control unit that performs power supply from the power storage apparatus to the first power load apparatuses,
  the power control method comprising:
  receiving a total power consumption amount of the second power load apparatuses from a power consumption amount detection device that detects the power consumption amounts of the second power load apparatuses,
  detecting the power consumption amount of the first power load apparatuses to detect a total power consumption amount of the first power load apparatuses,
  determining whether a sum of the total power consumption amount of the second power load apparatuses and the total power consumption amount of the first power load apparatuses exceeds a threshold of a system power consumption amount, and
  stopping supply of power received from a power supply system to the first power load apparatuses and performs power supply from the power storage apparatus to the first power load apparatuses when the sum of the total power consumption amount of the second power load apparatuses and the total power consumption amount of the first power load apparatuses exceeds a threshold indicating a maximum value of the system power consumption amount.

6. The power control method according to claim 5, comprising a power generation apparatus, wherein:
  the power supply system is each system of power supplied from a power network of an electric power company and power supplied from the power generation apparatus, and
  the power supply control unit of the power gateway apparatus supplies the power supplied from the power generation apparatus to the first power load apparatuses with priority to the power received from the power network.

7. A power gateway apparatus comprising, among a plurality of power load apparatuses, first power load apparatuses that use power supplied from a power storage apparatus when a total power consumption amount of all of the plurality of power load apparatuses is greater than or equal to a threshold, and second power load apparatuses not included among the first power load apparatuses, a power gateway apparatus that performs control of power supply to the first power load apparatuses, the power gateway apparatus comprising:
  a second power load apparatus consumption amount reception unit that receives a total power consumption amount of the second power load apparatuses from a power consumption amount detection device that detects the power consumption amounts of the second power load apparatuses;
  a first power load apparatus consumption amount detection unit that detects the power consumption amount of the first power load apparatuses to detect a total power consumption amount of the first power load apparatuses;
  a total power consumption amount determination unit that determines whether a sum of the total power consumption amount of the second power load apparatuses and the total power consumption amount of the first power load apparatuses exceeds a threshold of a system power consumption amount; and a power supply control unit that stops supply of power received from a power supply system to the first power load apparatuses and performs power supply from the power storage apparatus to the first power load apparatuses when the sum of the total power consumption amount of the second power load apparatuses and the total power consumption amount of the first power load apparatuses exceeds a threshold indicating a maximum value of the system power consumption amount.

8. The power gateway apparatus according to claim 7, comprising a power generation apparatus, wherein:
the power supply system is each system of power supplied from a power network of an electric power company and power supplied from the power generation apparatus, and
the power supply control unit supplies the power supplied from the power generation apparatus to the first power load apparatuses with priority to the power received from the power network.

9. The power control system according to claim 2, wherein the power supply control unit of the power gateway apparatus supplies the power received from the power supply system to the first power load apparatuses when the sum of the total power consumption amount of the second power load apparatuses and the total power consumption amount of the first power load apparatuses is less than the threshold indicating the maximum value of the system power consumption amount and when the power storage capacity of the power storage apparatus is the maximum value.

10. The power control system according to claim 2, comprising a power generation apparatus, wherein:
the power supply system is each system of power supplied from a power network of an electric power company and power supplied from the power generation apparatus, and
the power supply control unit of the power gateway apparatus supplies the power supplied from the power generation apparatus to the first power load apparatuses with priority to the power received from the power network.

11. The power control system according to claim 3, comprising a power generation apparatus, wherein:
the power supply system is each system of power supplied from a power network of an electric power company and power supplied from the power generation apparatus, and
the power supply control unit of the power gateway apparatus supplies the power supplied from the power generation apparatus to the first power load apparatuses with priority to the power received from the power network.

12. The power control system of claim 1, wherein the threshold is a maximum value of power which the power supply system supplies to the first power load apparatus when the second power load apparatus is able to stably obtain power.

13. The power control system of claim 1, wherein the total power consumption amount determination unit is further configured to determine whether the sum of the total power consumption amount of the second power load apparatuses and the total power consumption amount of the first power load apparatuses exceeds another threshold of the system power consumption amount.

* * * * *